(12) United States Patent
Kobayashi et al.

(10) Patent No.: US 11,318,497 B2
(45) Date of Patent: May 3, 2022

(54) ULTRASONIC INSPECTION DEVICE (71) Applicant: KABUSHIKI KAISHA TOSHIBA, Minato-ku (JP)

(72) Inventors: Tsuyoshi Kobayashi, Kawasaki (JP); Tomio Ono, Yokohama (JP); Yasuharu Hosono, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 303 days.

(21) Appl. No.: 16/565,791

(22) Filed: Sep. 10, 2019

(65) Prior Publication Data

US 2020/0298274 A1    Sep. 24, 2020

(30) Foreign Application Priority Data

Mar. 19, 2019 (JP) .............................. JP2019-051592

(51) Int. Cl.
*B06B 1/06* (2006.01)
*G01N 29/34* (2006.01)
*B06B 1/02* (2006.01)

(52) U.S. Cl.
CPC .......... *B06B 1/0207* (2013.01); *B06B 1/0622* (2013.01); *G01N 29/34* (2013.01)

(58) Field of Classification Search
CPC .. B06B 1/0207; B06B 1/0622; G01N 29/262; G01N 29/34; G01N 29/221; G01N 2291/2638; G01N 2291/106; G10K 11/34
USPC ........................................................ 73/662
See application file for complete search history.

(56) References Cited

U.S. PATENT DOCUMENTS

| | | | |
|---|---|---|---|
| 4,215,584 A | 8/1980 | Kuroda et al. | |
| 4,371,805 A * | 2/1983 | Diepers | B06B 1/0614 310/334 |
| 4,537,074 A | 8/1985 | Dietz | |
| 4,604,897 A | 8/1986 | Saglio | |
| 8,393,218 B2 * | 3/2013 | Yamano | G01N 29/043 73/632 |
| 10,261,055 B2 * | 4/2019 | Takemoto | G01N 29/262 |
| 2005/0081636 A1 | 4/2005 | Barshinger et al. | |
| 2007/0266792 A1 | 11/2007 | Oosawa | |
| 2011/0126626 A1 | 6/2011 | Koch et al. | |
| 2014/0043933 A1 | 2/2014 | Belevich et al. | |
| 2014/0060196 A1 * | 3/2014 | Falter | G01N 29/262 73/632 |
| 2014/0083193 A1 * | 3/2014 | Inagaki | G01N 29/2456 73/629 |

(Continued)

FOREIGN PATENT DOCUMENTS

| | | |
|---|---|---|
| EP | 0 641 606 A2 | 3/1995 |
| GB | 1 514 050 A | 6/1978 |

(Continued)

*Primary Examiner* — Jacques M Saint Surin
(74) *Attorney, Agent, or Firm* — Oblon, McClelland, Maier & Neustadt, L.L.P.

(57) ABSTRACT

An ultrasonic inspection device according to an embodiment includes: an ultrasonic transducer which includes at least one oscillator group having a plurality of oscillators in a plurality of regions, each region disposing at least one oscillator; a selector which selects at least one region having one or more of the oscillators to be driven from among the plurality of regions; and a driver which individually drives one or more of the oscillators of the at least one region being selected.

6 Claims, 4 Drawing Sheets

(56) References Cited

U.S. PATENT DOCUMENTS

| | | | |
|---|---|---|---|
| 2017/0074831 A1 | 2/2017 | Zhang et al. | |
| 2017/0112476 A1 | 4/2017 | Belevich et al. | |
| 2019/0008487 A1 | 1/2019 | Belevich et al. | |

FOREIGN PATENT DOCUMENTS

| | | | |
|---|---|---|---|
| JP | 53-32987 A | 3/1978 | |
| JP | 58-48222 U | 4/1983 | |
| JP | 59-95262 U | 6/1984 | |
| JP | 60-102553 A | 6/1985 | |
| JP | 5-38335 A | 2/1993 | |
| JP | 7-107595 A | 4/1995 | |
| JP | H11-211701 A | 8/1999 | |
| JP | 2003-9288 A | 1/2003 | |
| JP | 2007-307288 A | 11/2007 | |
| JP | 2008-61809 A | 3/2008 | |
| JP | 2008-66972 A | 3/2008 | |
| JP | 2010-214015 A | 9/2010 | |
| JP | 2015-528331 A | 9/2015 | |
| JP | 2018-136252 A | 8/2018 | |

\* cited by examiner

ULTRASONIC INSPECTION DEVICE

CROSS REFERENCE TO RELATED APPLICATION

This application is based upon and claims the benefit of priority from Japanese Patent Application No. 2019-051592, filed on Mar. 19, 2019; the entire contents of which are incorporated herein by reference.

FIELD

Embodiments described herein relate generally to an ultrasonic inspection device.

BACKGROUND

Ultrasonic inspection devices have been used for medical diagnosis and non-destructive inspections of various members, devices, and so on. The ultrasonic inspection device includes: for example, an ultrasonic transducer which irradiates ultrasonic waves on an inspection object portion and receives reflected waves from the inspection object portion; and a controller which performs an inspection process of a state of the inspection object portion by using the reflected waves received by the ultrasonic transducer. There are known a single type probe which transmits and receives ultrasonic waves by one oscillator, a linear array-type probe which transmits and receives ultrasonic waves by a plurality of oscillators arranged linearly, and so on as the ultrasonic transducer. The linear array-type probe is generally used with an aim of enlargement or the like of an imaging range of a flaw-detection portion.

When a direction where the plurality of oscillators are arranged is expressed as an array direction and a direction corresponding to a width of the oscillator orthogonal to the array direction is expressed as an aperture of the oscillator, an imaging range of the ultrasonic transducer is widened (enabling a high viewing angle) by a phased array drive system where respective oscillators are driven not all at once but with delay when the plurality of oscillators in the array direction are individually driven. Meanwhile, since a viewing angle in the width direction of the oscillator is uniquely defined by the aperture, that is, the width of the oscillator, the flaw-detection and the imaging range are fixed to the viewing angle in the width direction in the linear array-type probe where the width of the oscillator is constant.

When a wider range is to be flaw-detected and imaged in the above-stated ultrasonic flaw-detection and imaging range, the imaging in the wider range is enabled by reducing the width of the oscillator, that is, the aperture of the oscillator. However, since sound pressures of transmission and reception of the oscillator decrease by reducing the width of the oscillator, an S/N ratio as the transducer decreases, and a clear image cannot be obtained. When the width of the oscillator is set to be suitable for imaging of an object at a long distance according to a size thereof, the viewing angle becomes relatively narrow due to a relation between the aperture of the oscillator and the viewing angle, and therefore, the size of the object which can be imaged is limited when the object at a short distance is imaged with the same oscillator. On the other hand, when the width of the oscillator having an enough viewing angle at the short distance is selected, the imaging range becomes unnecessarily wide at the long distance, and the S/N ratio decreases because the width of the oscillator is small as opposed to the imaging range, resulting in that it is not suitable for imaging at the long distance.

DETAILED DESCRIPTION

An ultrasonic inspection device according to the embodiment includes: an ultrasonic transducer which includes at least one oscillator group having a plurality of oscillators in a plurality of regions, each region disposing at least one oscillator; a selector which selects at least one region having one or more of the oscillators to be driven from among the plurality of regions; and a driver which individually drives one or more of the oscillators of the at least one region being selected.

Ultrasonic inspection devices in embodiments will be described hereinafter with reference to the drawings. Note that substantially the same components are denoted by the same reference signs, and description thereof may be partially omitted in some cases in the embodiments. The drawings are schematic, and the relation between thicknesses and plane dimensions of parts, ratios of the thicknesses of the parts and the like may differ from actual ones. The terms indicating upper and lower directions in the description may differ from actual directions based on the gravitational acceleration direction.

First Embodiment

Figure 1:
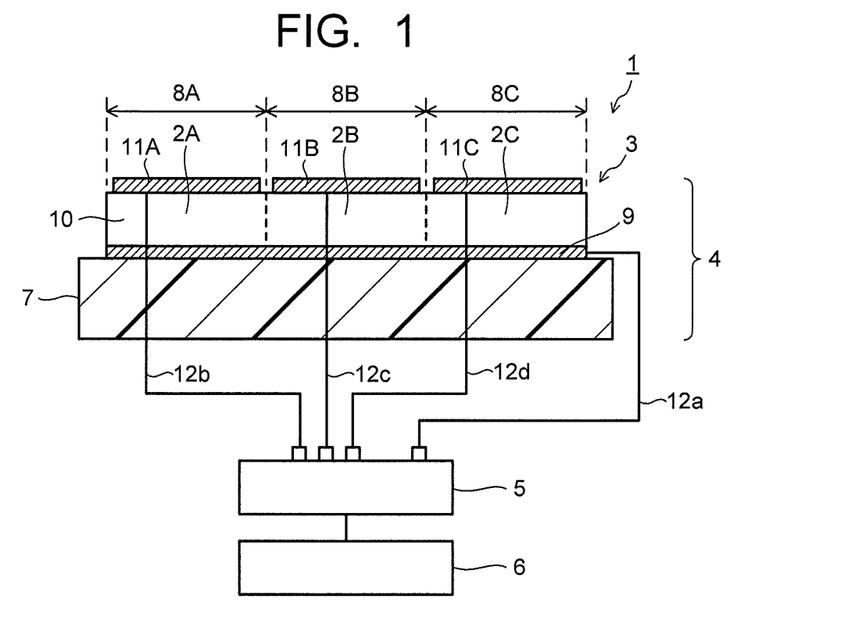
FIG. 1 is a view illustrating an ultrasonic inspection device according to a first embodiment.

FIG. 1 is a view illustrating a configuration of an ultrasonic inspection device according to a first embodiment. An ultrasonic inspection device 1 illustrated in FIG. 1 includes: an ultrasonic transducer (ultrasonic probe) 4 which includes a oscillator group 3 having a plurality of oscillators (piezoelectric oscillators) 2 (2A, 2B, 2C); a driver 5 which drives the plurality of oscillators 2A, 2B, 2C; and a controller 6 which has a control circuit controlling operations of the driver 5, a switching circuit switching the driving of the plurality of oscillators 2, a signal processing circuit processing reflected signals of ultrasonic waves, and so on. The controller 6 includes a selector.

The oscillator group 3 is disposed on a backing material 7 which absorbs to suppress residual vibration of the ultrasonic waves. The plurality of oscillators 2 forming the oscillator group 3 are divided into a plurality of regions 8 (8A, 8B, 8C). That is, the three oscillators 2A, 2B, 2C are respectively disposed at a region 8A, a region 8B, and a region 8C. The three oscillators 2A, 2B, 2C are formed by providing individual electrodes 11 (11A, 11B, 11C) corresponding to the three regions 8A, 8B, 8C on a surface of a piezoelectric body 10 which has a common electrode 9 on a rear surface side. The three oscillators 2A, 2B, 2C can be individually and independently functioned as piezoelectric oscillators while having the common piezoelectric body 10. The oscillator 2 may have a matching layer or the like provided on a transmission/reception surface of the ultrasonic waves according to need.

The three oscillators 2A, 2B, 2C are individually connected to the driver 5 and the controller 6 through driving circuit wirings 12. The common electrode 9 is connected to the driver 5 through a driving circuit wiring 12a. The individual electrodes 11A, 11B, 11C of the oscillators 2A, 2B, 2C are respectively connected to the driver 5 through driving circuit wirings 12b, 12c, 12d. A driving voltage is applied to the oscillators 2A, 2B, 2C from the driver 5 through the driving circuit wirings 12, and signals such as received signals are transmitted and received between the oscillators 2A, 2B, 2C and the controller 6 through the driving circuit wirings 12. The oscillators 2A, 2B, 2C are individually driven based on control signals transmitted from the controller 6 to the driver 5, and on/off of oscillation of the ultrasonic waves are individually controlled. The controller 6 has a switching circuit which adjusts and switches the oscillators 2 and the number of oscillators 2 to be driven from among the oscillators 2A, 2B, 2C.

The driver 5 includes a power supply such as a pulsar power supply which drives the oscillators 2A, 2B, 2C with pulse waves, rectangular waves, burst waves or the like to oscillate the ultrasonic waves. When voltage is applied from the power supply of the driver 5 to the common electrode 9 and the individual electrodes 11A, 11B, 11C of the oscillators 2A, 2B, 2C, an electric field is applied to each of the oscillators 2A, 2B, 2C to generate displacement in the oscillators 2A, 2B, 2C. The oscillators 2A, 2B, 2C thereby individually oscillate the ultrasonic waves. When the ultrasonic waves are oscillated from the plurality of oscillators 2 from among the oscillators 2A, 2B, 2C, these oscillators 2 are simultaneously driven without delaying driving timings.

In the ultrasonic inspection device 1 according to the first embodiment, the controller 6 selects the region 8 to be driven from among the plurality of regions 8A, 8B, 8C, and controls the driver 5 to drive the oscillators 2 disposed at the selected region 8. For example, when the regions 8A, 8B, 8C where the oscillators 2A, 2B, 2C forming the oscillator group 3 are respectively disposed are divided into first regions 8A, 8C each located at an outer side and a second region 8B located at an inner side, the controller 6 has a function to select between a case when only the oscillator 2B disposed at the second region 8B is driven and a case when all of the oscillators 2A, 2B, 2C including the oscillators 2A, 2C disposed at the first regions 8A, 8C are driven, and to switch the oscillators 2 and the number of oscillators 2 to be driven. For example, when the oscillators 2A, 2B, 2C each have the same width (aperture) W, a substantial width (aperture) of the oscillator 2 becomes W in the case when only the oscillator 2B is driven, but the substantial width (aperture) of the oscillator 2 becomes 3 W being three times in the case when all of the oscillators 2A, 2B, 2C are driven.

When an inspection object range in an ultrasonic inspection exists at a short distance, a radiation angle of the ultrasonic waves is required to be wider compared to a case when the inspection object range with the same size exists at a long distance. Since the radiation angle of the ultrasonic waves depends on the aperture of the oscillator, the width (aperture) of the oscillator is necessary to be narrowed in order to widen the radiation angle of the ultrasonic waves of one oscillator. However, though the radiation angle of the ultrasonic waves is widened by narrowing the width of the oscillator in accordance with the inspection object range at the short distance, an effective area of ultrasonic radiation of the oscillator decreases at the same time, resulting in that sensitivity of the ultrasonic transducer decreases. When the ultrasonic waves are irradiated on the inspection object at the long distance by using such an oscillator, the sensitivity of the ultrasonic transducer decreases because an imaging range becomes unnecessarily wide.

Figure 2:
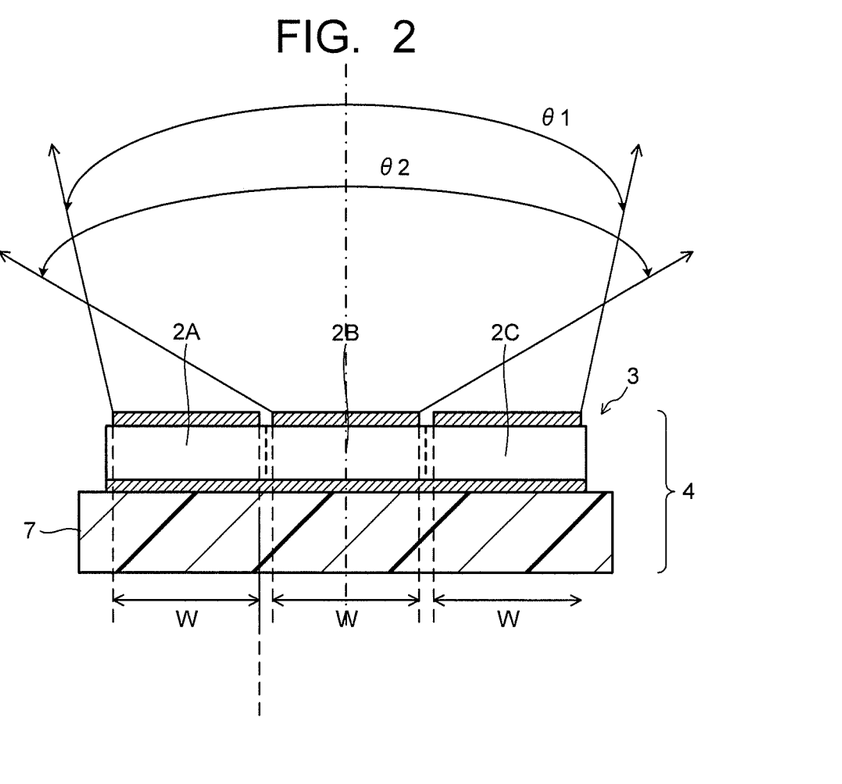
FIG. 2 is a view illustrating an operation state of the ultrasonic inspection device illustrated in FIG. 1.

When the inspection object portion is at the long distance and the wide ultrasonic radiation angle is not necessary, the ultrasonic transducer 4 of the embodiment selects and drives the three oscillators 2A, 2B, 2C. In this case, since the width (aperture) of the oscillator 2 becomes 3 W, the ultrasonic waves can be irradiated on the inspection object portion at an ultrasonic radiation angle $\theta 1$ in accordance with the inspection object at the long distance as illustrated in FIG. 2, that is, the relatively narrow ultrasonic radiation angle $\theta 1$. In this case, since the width of the oscillator 2 is 3 W, and the ultrasonic waves can be irradiated on the inspection object portion while keeping the width of the oscillator 2 wide, ultrasonic flaw-detection with high sensitivity and good S/N ratio is enabled.

Meanwhile, when the inspection object portion exists at the short distance, the ultrasonic transducer 4 of the embodiment selects and drives only the oscillator 2B. Since the width (aperture) of the oscillator 2 in this case is as small as W, the ultrasonic waves can be irradiated on the inspection object portion at an ultrasonic radiation angle $\theta 2$ in accordance with the inspection object at the short distance as illustrated in FIG. 2, that is, the wide ultrasonic radiation angle $\theta 2$. Accordingly, the ultrasonic flaw-detection can be performed at the wide ultrasonic radiation angle in accordance with the inspection object range at the short distance. Here, there is fear that desensitization occurs or the S/N ratio decreases by reducing the width of the oscillator 2. However, a path for transmission/reception of the ultrasonic waves becomes short in the short distance flaw-detection compared to the long distance flaw-detection, and the ultrasonic waves attenuate by the square of the distance. Accordingly, accuracy of the ultrasonic flaw-detection can be kept because an effect caused by reducing the width of the oscillator 2 can be suppressed compared to the long-distance flaw-detection at an actual flaw-detection time.

As mentioned above, in the ultrasonic inspection device 1 of the embodiment, the oscillators 2A, 2B, 2C divided into three parts are selectively switched to be driven in accordance with a distance of the inspection object portion from the ultrasonic transducer 4. Concretely, it is selected whether only the oscillator 2B disposed at the inner region 8B is driven or all of the oscillators 2A, 2B, 2C are driven, and the ultrasonic waves can be irradiated at the ultrasonic radiation angle in accordance with the distance of the inspection object portion. Accordingly, the ultrasonic flaw-detection with good S/N ratio and excellent inspection accuracy is enabled by one ultrasonic transducer 4 regardless that the inspection object portion is located at the long distance or the short distance.

Figure 3:
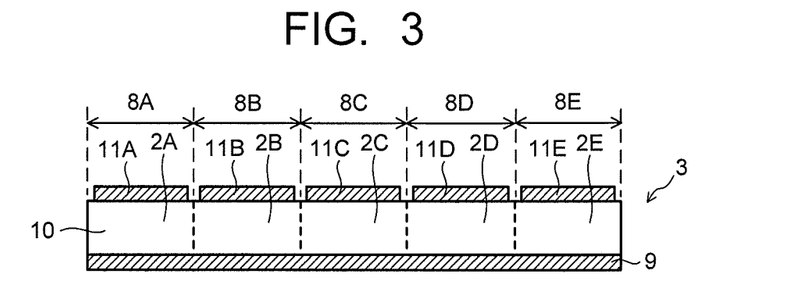
FIG. 3 is a view illustrating a first modification example of an ultrasonic probe in the ultrasonic inspection device illustrated in FIG. 1.

In the ultrasonic inspection device 1 of the embodiment, the number of regions 8 dividing the oscillator group 3 is not limited to three. For example, the oscillator group 3 may be divided into five regions 8A, 8B, 8C, 8D, 8E as illustrated in FIG. 3. One oscillator 2 is disposed at each of the regions 8. The oscillator group 3 is divided into, for example, first regions 8A, 8E each located at an outer side, a second region 8C located at a center, and third regions 8B, 8D each located at an intermediate thereof. The controller 6 selects and switches a case when only the oscillator 2C disposed at the second region (central region) 8C is driven, a case when the oscillators 2B, 2C, 2D disposed at the second region (central region) 8C and the third regions (intermediate regions) 8B, 8D are driven, and a case when all of the oscillators 2A, 2B, 2C, 2D, 2E are driven. The ultrasonic flaw-detection with good S/N ratio and excellent inspection accuracy is enabled by one ultrasonic transducer 4 regardless of the distance to the inspection object portion by adjusting the number of oscillators 2 and the width of the oscillator 2 based thereon, and adjusting the ultrasonic radiation angle and the proper distance to the inspection object portion based thereon as stated above.

Figure 4:
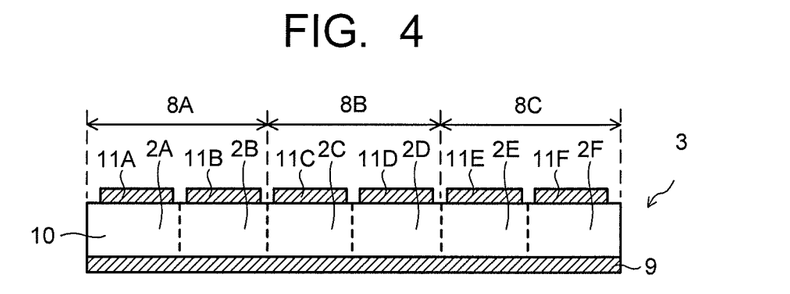
FIG. 4 is a view illustrating a second modification example of an ultrasonic probe in the ultrasonic inspection device illustrated in FIG. 1.

The number of oscillators 2 disposed in each of the regions 8 dividing the oscillator group 3 is not limited to one. For example, the oscillator group 3 may be divided into the three regions 8A, 8B, 8C and the plurality of oscillators 2 may be disposed at each of the regions 8A, 8B, 8C as illustrated in FIG. 4. In FIG. 4, two oscillators 2A, 2B are disposed at the region 8A, two oscillators 2C, 2D are disposed at the region 8B, and two oscillators 2E, 2F are disposed at the region 8C. The width of each oscillator 2 may be adjusted instead of adjusting the number of oscillators 2 as stated above. The distance to the inspection object portion capable of irradiating the ultrasonic waves properly can be adjusted by adjusting the number of oscillators 2 or the width of the oscillator 2.

Figure 5:
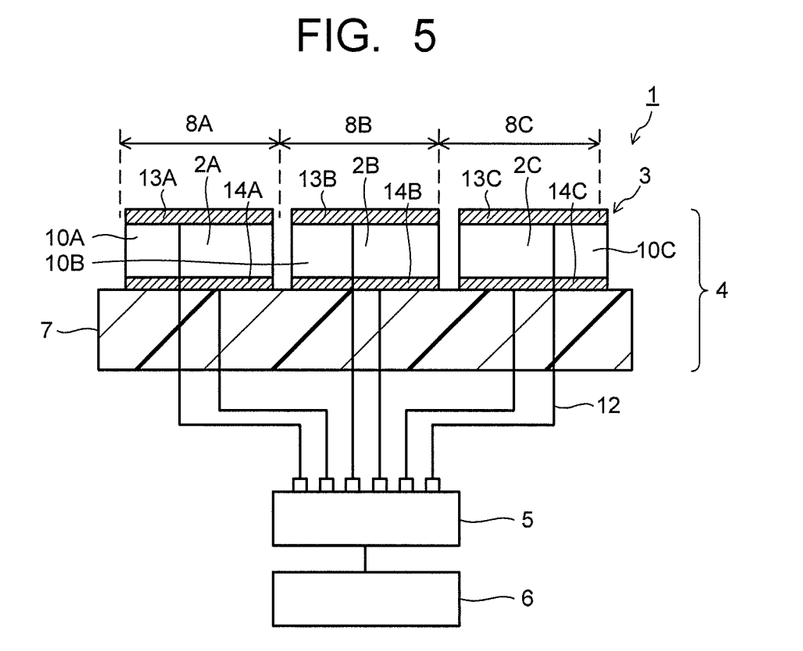
FIG. 5 is a view illustrating a third modification example of the ultrasonic inspection device illustrated in FIG. 1.

Further, a configuration of the oscillator 2 forming the oscillator group 3 is not limited to a structure where the plurality of individual electrodes 11 are disposed at one piezoelectric body 10 as illustrated in FIG. 1. For example, the oscillators 2 (2A, 2B, 2C) respectively formed by upper electrodes 13 (13A, 13B, 13C), the piezoelectric bodies 10 (10A, 10B, 10C), and lower electrodes 14 (14A, 14B, 14C) may be disposed on the backing material 7 in accordance with the respective regions 8A, 8B, 8C as illustrated in FIG. 5. The similar effect as the oscillators 2 illustrated in FIG. 1 can be obtained by the oscillators 2 as stated above. Note that the plurality of oscillators 2 which are divided by providing the common electrode 9 and the plurality of individual electrodes 11 on one piezoelectric body 10 as the oscillators 2 illustrated in FIG. 1 are able to increase ultrasonic characteristics when oscillating the ultrasonic waves with a relatively narrow radiation angle, and to reduce a manufacturing cost of the oscillators 2 divided into plural parts.

Second Embodiment

Figure 6:
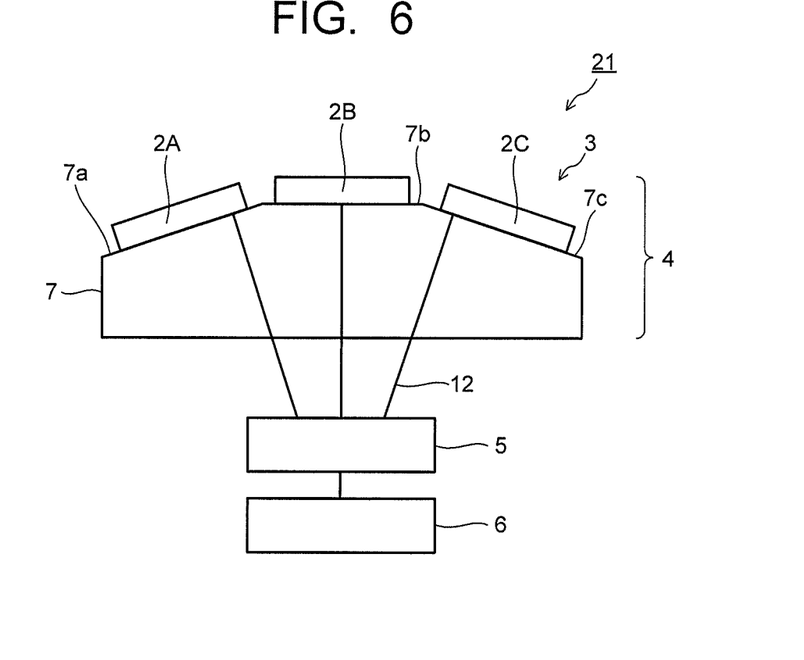
FIG. 6 is a view illustrating an ultrasonic inspection device according to a second embodiment.

FIG. 6 is a view illustrating a configuration of an ultrasonic inspection device according to a second embodiment. An ultrasonic inspection device 21 illustrated in FIG. 6 includes the backing material 7 having polygonal installation surfaces of the oscillators 2 and including three installation surfaces 7a, 7b, 7c whose installation directions are made different toward directions where radiation directions of the ultrasonic waves are to be widened. The oscillators 2A, 2B, 2C are respectively installed on oscillator installation surfaces (ultrasonic radiation surfaces) 7a, 7b, 7c of the backing material 7. The oscillators 2A, 2B, 2C illustrated in FIG. 6 respectively have the upper electrodes 13A, 13B, 13C, the piezoelectric bodies 10A, 10B, 10C, and the lower electrodes 14A, 14B, 14C similar to the oscillators 2A, 2B, 2C illustrated in FIG. 5 though these are not illustrated in FIG. 6.

In the ultrasonic inspection device 21 illustrated in FIG. 6, the oscillators 2 each with, for example, a width of 15 mm, a thickness of 0.5 mm, and a frequency constant of 2000 Hzm are used, and three pieces of oscillators 2A, 2B, 2C are each disposed in a direction where the radiation direction of the ultrasonic waves is to be widened. An ultrasonic radiation angle obtained by the oscillator 2 with the width of 15 mm is about 10 degrees. When only the oscillator 2B at the inner region 8B is driven, the ultrasonic waves can be radiated in a range of approximately 10 degrees. Further, when the three oscillators 2A, 2B, 2C were disposed while keeping each angle pitch of 10 degrees and these were simultaneously driven, a reflector plate of the ultrasonic waves was located while setting a distance to a flaw-detection object as 1 m, and measurement and evaluation of a sensitivity distribution of ultrasonic wave transmission/reception were performed. As a result, it was verified that large desensitization did not occur in transmission/reception sensitivity of the ultrasonic transducer 4 up to 30 degrees. Accordingly, the angle of the ultrasonic transducer 4 can be widened while keeping the flaw-detection range of the inspection object by disposing the plurality of oscillators 2.

Note that the width of the oscillator 2, the ultrasonic radiation angle obtained by combining the oscillators 2, and so on are denoted just as an example, and are not limited to these numeric values. Each numeric value is appropriately set in accordance with a size of the object of the ultrasonic flaw-detection and a distance from the ultrasonic transducer 4. The selection of the oscillators 2 and the drive based thereon are performed by the driver 5 and the controller 6 as same as the first embodiment.

Third Embodiment

Figure 7:
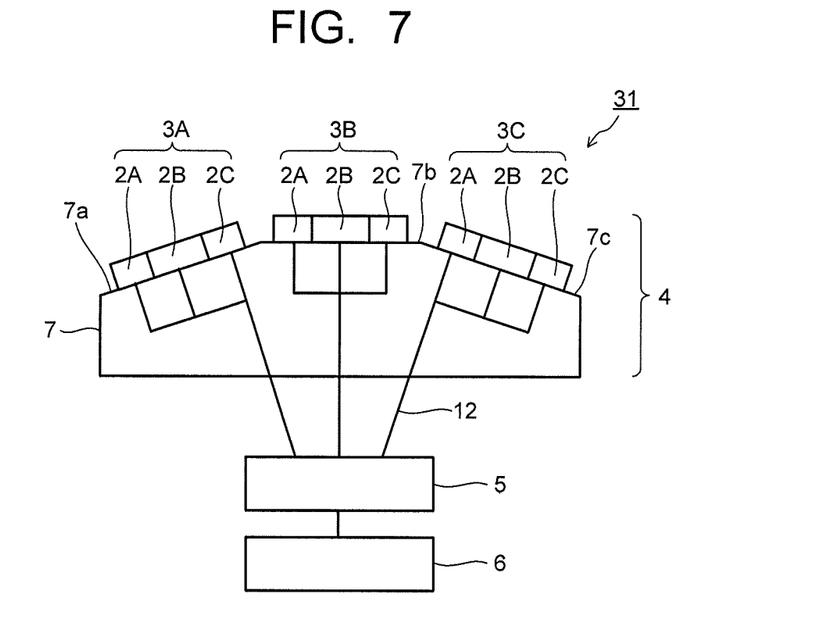
FIG. 7 is a view illustrating an ultrasonic inspection device according to a third embodiment.

FIG. 7 is a view illustrating a configuration of an ultrasonic inspection device according to a third embodiment. An ultrasonic inspection device 31 illustrated in FIG. 7 includes the backing material 7 having the polygonal installation surfaces of the oscillators 2 and including the three installation surfaces (ultrasonic radiation surfaces) 7a, 7b, 7c whose installation directions are made different toward directions where radiation directions of the ultrasonic waves are to be widened as same as the ultrasonic inspection device 21 according to the second embodiment. Oscillator groups 3A, 3B, 3C are respectively installed on the installation surfaces 7a, 7b, 7c of the backing material 7. The ultrasonic inspection device 31 according to the third embodiment includes a plurality of oscillator groups 3. The oscillator groups 3A, 3B, 3C respectively have the three oscillators 2A, 2B, 2C. The oscillator groups 3A, 3B, 3C each have the configuration as same as the oscillator group 3 illustrated in FIG. 1.

In the ultrasonic transducer 4 according to the third embodiment, the oscillator groups 3A, 3B, 3C each have the shape with, for example, the width of 15 mm and the thickness of 0.5 mm, further a frequency constant is set as 2000 Hzm. Each of the oscillator groups 3A, 3B, 3C is divided into the three oscillators 2A, 2B, 2C as same as the first embodiment. Each of the oscillator groups 3A, 3B, 3C has the oscillator 2A with the width of 4 mm, the oscillator 2B with the width of 7 mm, and the oscillator 2C with the width of 4 mm. These three oscillators 2A, 2B, 2C form one set of oscillator group 3. That is, the ultrasonic transducer 4 according to the third embodiment includes nine oscillators 2 as a total by one set of three oscillator groups 3A, 3B, 3C as a whole. The ultrasonic radiation angle formed by the oscillator group with the width of 15 mm is about 10 degrees, and the sensitivity of the ultrasonic wave transmission/reception decreases in a range over 10 degrees in one set of oscillator group 3. In the third embodiment, the three sets of oscillator groups 3A, 3B, 3C each with the radiation angle of 10 degrees are held at an angle pitch of 10 degrees as illustrated in FIG. 7.

In the ultrasonic inspection device 31 according to the third embodiment, it is assumed that the inspection object of the ultrasonic flaw-detection has the width of 1 m and the distance from the ultrasonic transducer 4 is 2 m. When the flaw-detection range as stated above is seen in terms of an angle from the ultrasonic transducer 4, it has an angle range of 25 degrees. One set of oscillator group with the width of 15 mm cannot cover this flaw-detection range, but the transmission/reception sensitivity decreases in the range over 10 degrees. In the third embodiment, the transmission/reception sensitivity of the ultrasonic transducer 4 does not largely decrease in the flaw-detection range in the angle of 30 degrees because the three oscillator groups 3 each having the width of 15 mm are disposed with the angle pitch of 10 degrees.

Next, it is considered a case when the inspection object with the width of 1 m exists at a distance of 90 cm. When the flaw-detection range is seen in terms of the angle from the ultrasonic transducer 4, it has the angle range of 50 degrees. One set of oscillator group with the width of 15 mm cannot cover this flaw-detection range, but the transmission/reception sensitivity decreases in the range over 10 degrees. Further, the transmission/reception sensitivity of the ultrasonic transducer decreases at both ends of the flaw-detection angle in the flaw-detection range of 50 degrees even when the three oscillator groups each with the width of 15 mm are just disposed at the angle pitch of 10 degrees because an effective flaw-detection range in this case is 30 degrees.

In the ultrasonic transducer 4 according to the third embodiment, only the oscillator 2B with the width of 7 mm at the center is driven on each surface from among the three oscillators 2A, 2B, 2C forming each of the three sets of oscillator groups 3A, 3B, 3C, and the oscillators 2A, 2C each with the width of 4 mm at an outer side are not driven. It is thereby possible to perform the flaw-detection in a wider range as a whole because the oscillator groups 3 which are disposed with the angle of 10 degrees each become the oscillator 2B with the width of 7 mm from the width of 15 mm and the radiation angle of one oscillator 2B becomes about 32 degrees. When the oscillator 2B with the width of 7 mm in the oscillator group 3A and the oscillator 2B with the width of 7 mm in the oscillator group 3C are simultaneously driven together with the oscillator 2B with the width of 7 mm in the oscillator group 3B, the reflector plate of the ultrasonic waves is located while setting the width of the flaw-detection object as 1 m and the distance to the object as 90 cm, and the evaluation measurement of the sensitivity distribution of the ultrasonic wave transmission/reception was performed. As a result, large desensitization of the transmission/reception sensitivity of the ultrasonic transducer 4 did not occur up to the ultrasonic radiation angle of 52 degrees, and it was verified that the flaw-detection range of the inspection object could be kept, and the widened angle effect of the ultrasonic transducer 4 was obtained by disposing the plurality of oscillator groups 3.

Note that the width of the oscillator group 3, the width of the oscillator 2 forming the oscillator group 3, the ultrasonic radiation angle obtained by combining the above, and so on are denoted just as an example, and are not limited to these numeric values. Each numeric value is appropriately set according to the size of the ultrasonic flaw-detection object and the distance from the ultrasonic transducer 4. The selection of the oscillator groups 3 and the oscillators 2 which are formed by dividing the oscillator group 3 into plural parts and the driving of the oscillators 2 based on the selection are performed by the driver 5 and the controller 6 as same as the first embodiment.

Fourth Embodiment

Figure 8:
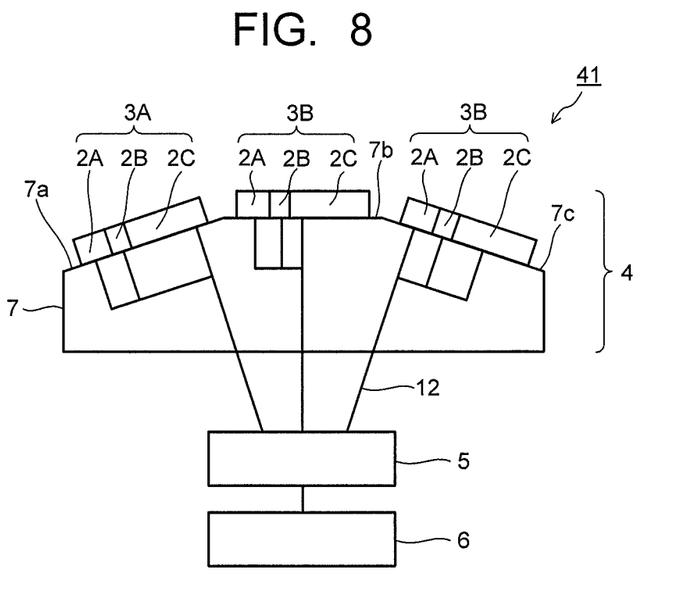
FIG. 8 is a view illustrating an ultrasonic inspection device according to a fourth embodiment.

FIG. 8 is a view illustrating a configuration of an ultrasonic inspection device according to a fourth embodiment. An ultrasonic inspection device 41 illustrated in FIG. 8 includes the oscillator groups 3A, 3B, 3C respectively installed on the three installation surfaces (ultrasonic radiation surfaces) 7a, 7b, 7c whose installation directions of the backing material 7 are made different as same as the third embodiment. Each of the oscillator groups 3A, 3B, 3C is divided into the three oscillators 2A, 2B, 2C. The oscillator groups 3A, 3B, 3C each have the shape, for example, with the width of 15 mm and the thickness of 0.5 mm as same as the third embodiment, further the frequency constant is set as 2000 Hzm. The oscillator groups 3A, 3B, 3C are each divided into the oscillator 2A with the width of 6 mm, the oscillator 2B with the width of 3 mm, and the oscillator 2C with the width of 12 mm. In the fourth embodiment, the widths of the oscillators 2A, 2B, 2C are different from those of the third embodiment, and such a configuration is also effective.

In the fourth embodiment, further various apertures as the oscillator group 3 can be selected by appropriately selecting the oscillators 2 to be driven from the oscillators 2A, 2B, 2C whose widths are different, and both widening of the angle and good sensitivity are obtained in accordance with the flaw-detection object and the distance thereof. For example, when the inspection object is located at a long distance, and the sensitivity as the transducer is required to be kept but the angle is not necessary to be widened, transmitted/received ultrasonic beams form an angle of about 7 degrees, and the high transmission/reception sensitivity in accordance with the relatively large aperture to be 21 mm can be kept within the above-stated range by simultaneously driving all of the oscillators 2A, 2B, 2C to set the aperture of the oscillator group 3 as 21 mm.

Meanwhile, when the inspection object is located at a short distance, and there is no worry in the sensitivity as the ultrasonic transducer 4 but it is necessary to widen the radiation angle, the transmitted/received ultrasonic beams form an angle of about 45 degrees and the flaw-detection can be kept within a large angle range in accordance with the small aperture to be 3 mm within this range by driving only the oscillator 2B whose aperture is the smallest among the oscillators 2A, 2B, 2C to set the aperture of the oscillator group 3 as 3 mm. Further, when the inspection object is located at a moderate distance and both the sensitivity as the ultrasonic transducer 4 and the widening of the angle are to be enabled, an arbitrary combination can be selected from among the three oscillators 2A, 2B, 2C. The aperture can be thereby variously set such as 3 mm (only the oscillator 2B), 6 mm (only the oscillator 2A), 9 mm (the oscillator 2A+the oscillator 2B), 12 mm (only the oscillator 2C), 15 mm (the oscillator 2B+the oscillator 2C), 21 mm (the oscillator 2A+the oscillator 2B+the oscillator 2C), and the transmitted/ received ultrasonic beams can keep the flaw-detection balanced in both the widening of the angle and the transmission/reception sensitivity.

Note that the above-stated width of the oscillator group 3 and width of the oscillator 2 forming the oscillator group 3, and the ultrasonic radiation angle formed by combining the above, and so on are denoted just as an example, and are not limited to these numeric values. Each numeric value is appropriately set in accordance with the size of the ultrasonic flaw-detection object and the distance from the ultrasonic transducer 4. The selection of the oscillator groups 3 and the oscillators 2 which are formed by dividing the oscillator group 3 into plural parts and the driving of the oscillators 2 based on the selection are performed by the driver 5 and the controller 6 as same as the first embodiment.

Fifth Embodiment

Figure 9:
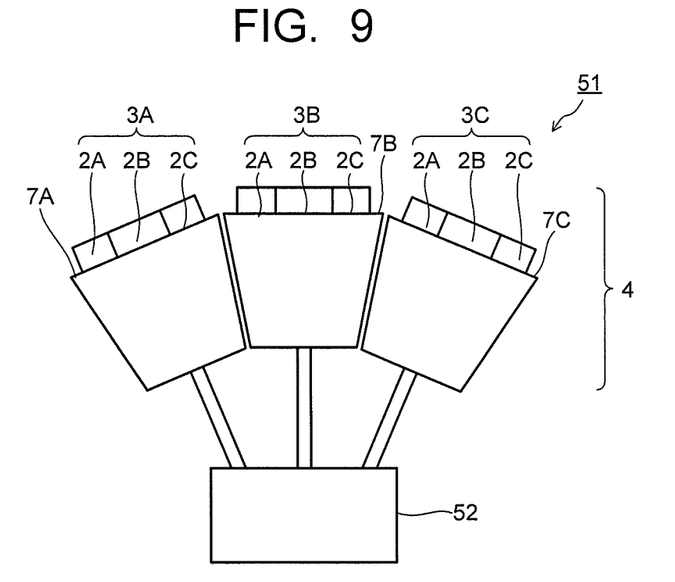
FIG. 9 is a view illustrating an ultrasonic inspection device according to a fifth embodiment.

FIG. 9 is a view illustrating a configuration of an ultrasonic inspection device according to a fifth embodiment. An ultrasonic inspection device 51 illustrated in FIG. 9 includes three pieces of oscillator groups 3A, 3B, 3C each divided into the three oscillators 2A, 2B, 2C as same as the third embodiment. The ultrasonic inspection device 51 according to the fifth embodiment includes independent backing materials 7A, 7B, 7C which are divided into three parts in accordance with the three pieces of oscillator groups 3A, 3B, 3C as the backing materials to fix and hold the oscillator groups 3. Further, a drive mechanism 52 is provided at a base part of the backing materials 7A, 7B, 7C so as to be able to make a central direction of the ultrasonic radiation of each oscillator group 3 variable.

For example, when the aperture of each oscillator 2 is set as 7 mm and the ultrasonic radiation range of each oscillator group 3 is set as 32 degrees, the flaw-detection in a range of 52 degrees as a total of the three surfaces can be performed as a result that the ultrasonic radiation range of each surface is widened. Since an angle pitch formed by the central direction of the ultrasonic radiation of each surface remains 10 degrees to be suitable for the long distance flaw-detection, the ultrasonic radiation ranges of the oscillators 2 which are selected to make the aperture small in accordance with the short distance flaw-detection are overlapped, and therefore, the flaw-detective range is not three times of the ultrasonic radiation range of each surface.

When the aperture of the oscillator 2 is set as small as 7 mm in accordance with the short distance flaw-detection, the angles formed by the independent backing materials 7A, 7B, 7C which are respectively integrated with the oscillator groups 3A, 3B, 3C are widened to be, for example, 32 degrees by the drive mechanism 52 at the base part in accordance with the widening of the ultrasonic radiation ranges of the oscillators 2. The overlap of the ultrasonic radiation ranges between the adjacent surfaces of the oscillators 2 with each other thereby decreases. Accordingly, the flaw-detection range of the ultrasonic transducer 4 as a whole becomes a value as large as 90 degrees which is near three times of the ultrasonic radiation range of each oscillator group 3 resulting in that the angle can be more widen.

In the above-stated each embodiment, examples of various widened-angle transducers each having three ultrasonic radiation surfaces are shown, but the number of ultrasonic radiation surfaces not limited to three, and it may be changed into five surfaces, nine surfaces, and so on. The number of ultrasonic radiation surfaces can be set properly. For example, in the ultrasonic transducer having five ultrasonic radiation surfaces, the surfaces to be driven can be variously changed such that the five surfaces are driven constantly, only the central three surfaces from among the five surfaces are driven according to need, or only the central and end part surfaces are driven. Reflection and interference of the ultrasonic waves in the flaw-detection range are suppressed and the flaw-detection with the better S/N ratio is enabled by omitting the oscillation of the ultrasonic waves from the oscillator groups and the oscillators more than enough. The ultrasonic radiation surfaces of the backing material 7 where the oscillators 2 and the oscillator groups 3 are installed are set to be the polygonal shape, but for example, the backing material 7 may be adhered on each surface of a polygonal base without being limited to the above. Further, the ultrasonic radiation surface of the backing material 7 may be a curvature capable of installing the oscillators 2 and the oscillator groups 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasonic inspection device, comprising:
   an ultrasonic transducer which includes at least one oscillator group comprising a piezoelectric body having a first surface and a second surface, a common electrode provided on the first surface of the piezoelectric body, and individual electrodes provided on the second surface of the piezoelectric body so that a plurality of oscillators are constituted, the plurality of oscillators being divided in a first region containing one of the individual electrodes located in one outside side of the piezoelectric body, a second region containing another one of the individual electrodes located in the other outside side of the piezoelectric body, and a third region containing another one of the individual electrodes located in an inner side between the first region and the second region;
   a selector which selects at least one region having the oscillator to be driven from among the first, second, and third regions; and
   a driver which individually drives the oscillator located at the at least one region being selected,
   wherein the selector includes a switching circuit switching between the driving of only the oscillator located at the third region and the driving of all of the oscillators located at the first, second, and third regions.

2. The device according to claim 1, wherein
   the ultrasonic transducer includes a plurality of the oscillator groups.

3. The device according to claim 2, wherein
   the ultrasonic transducer includes a base having polygonal ultrasonic radiation surfaces, and the oscillator group is installed on each of the polygonal ultrasonic radiation surfaces.

4. The device according to claim 1, wherein
   the ultrasonic transducer includes a base having polygonal ultrasonic radiation surfaces, and the oscillator is installed on each of the polygonal ultrasonic radiation surfaces.

5. The device according to claim 3, wherein
the selector simultaneously selects the oscillators from among the oscillator groups installed on the ultrasonic radiation surfaces.

6. The device according to claim 1, wherein
the ultrasonic transducer comprises a plurality of bases each having an ultrasonic radiation surface on which the oscillator or the oscillator group is installed, and a drive mechanism changing an angle of surfaces of the plurality of bases.

* * * * *